(12) United States Patent
Mizutani et al.

(10) Patent No.: US 7,148,680 B2
(45) Date of Patent: Dec. 12, 2006

(54) ROTATION ANGLE DETECTING DEVICE INCLUDING MAGNETIC MEMBER WITH CONCAVE SURFACE

(75) Inventors: Akitoshi Mizutani, Okazaki (JP); Takao Ban, Toyohashi (JP)

(73) Assignee: Denso Corporation, Kariya (JP)

( * ) Notice: Subject to any disclaimer, the term of this patent is extended or adjusted under 35 U.S.C. 154(b) by 155 days.

(21) Appl. No.: 10/801,010

(22) Filed: Mar. 16, 2004

(65) Prior Publication Data
US 2004/0189288 A1   Sep. 30, 2004

(30) Foreign Application Priority Data
Mar. 31, 2003  (JP)  ............... 2003-096737
Feb. 4, 2004   (JP)  ............... 2004-028085

(51) Int. Cl.
*G01B 7/30*   (2006.01)
(52) U.S. Cl. ............... 324/207.25; 324/207.2
(58) Field of Classification Search ........... 324/207.12, 324/207.2, 207.21, 207.22, 207.24, 207.25; 338/32 R, 32 H
See application file for complete search history.

(56) References Cited

U.S. PATENT DOCUMENTS

| 5,544,000 A | 8/1996 | Suzuki et al. ............ 324/207.2 |
| 6,215,299 B1 * | 4/2001 | Reynolds et al. ........ 324/207.2 |
| 6,310,473 B1 * | 10/2001 | Zhao ..................... 324/207.25 |
| 6,486,764 B1 * | 11/2002 | Byram ....................... 336/110 |
| 6,489,761 B1 * | 12/2002 | Schroeder et al. ..... 324/207.25 |
| 6,724,185 B1 * | 4/2004 | Ooki et al. .............. 324/207.2 |
| 6,867,583 B1 * | 3/2005 | Mizutani et al. ....... 324/207.24 |
| 2003/0094941 A1 * | 5/2003 | Mizutani et al. ......... 324/207.2 |

FOREIGN PATENT DOCUMENTS

| JP | 64-37607 | 2/1989 |
| JP | 2-122205 | 5/1990 |
| JP | 2-298815 | 12/1990 |

* cited by examiner

*Primary Examiner*—Jay M. Patidar
(74) *Attorney, Agent, or Firm*—Nixon & Vanderhye, P.C.

(57) ABSTRACT

A rotation angle detecting device for a rotation object includes a rotor and a pair of permanent magnets and a magnetic detector disposed at the rotation axis of the rotation object. One of the permanent magnets has a circumferentially extending rut-shape concavity around the magnet detector or an axially extending elliptic columnar surface having a central portion thicker than others to make magnetic flux density in the vicinity of said magnetic detector constant in an axial or a diametrical direction.

21 Claims, 8 Drawing Sheets

ROTATION ANGLE DETECTING DEVICE INCLUDING MAGNETIC MEMBER WITH CONCAVE SURFACE

CROSS REFERENCE TO RELATED APPLICATION

The present application is based on and claims priority from the following Japanese Patent Applications: 2003-96737, filed Mar. 31, 2003; and 2004-28085, filed Feb. 4, 2004; the contents of which are incorporated herein by reference.

BACKGROUND OF THE INVENTION

1. Field of the Invention

The present invention relates to a rotation angle detecting device which detects a relative rotation angle between a rotary object and a stationary object. Such a rotation angle detecting device can be used for an engine throttle valve control, a robot arm control and the like.

2. Description of the Related Art

A conventional rotation angle detecting device includes a magnetic sensor element, such as a hall element integrated with an IC chip, and a pair of semi-cylindrical permanent magnets disposed to surround the magnetic sensor element, as shown in JP-B2-3206204, JP-A-Hei 2-122205, JP-A-Hei 2-298815 and JP-A-sho 64-37607. Such a conventional rotation angle detecting device has the following problems.

(1) Magnetic leakage is significant at axial ends of the permanent magnets. If the magnetic sensor element shifts in the axial direction or along the center axis of rotation, a predetermined amount of magnetic flux is not supplied to the magnetic sensor element, so that the magnetic sensor element can not detect an accurate rotation angle when a rotary object rotates.

(2) If the magnetic sensor element shifts a little in a diametrical direction or a direction perpendicular to the rotary shaft, a predetermined amount of the magnetic flux does not pass through the magnetic sensor element, so that the magnetic sensor element can not detect an accurate rotation angle when a rotary object rotates.

SUMMARY OF THE INVENTION

The present invention has been made to solve the above problem and has the following objects.

The first object is to prevent a detection error by keeping the magnetic flux that passes through the magnetic sensor element constant even if the magnetic sensor element shifts in an axial or diametrical direction.

The second object is to prevent detection errors even if the magnetic sensor element shifts in both radial direction and axial direction.

According to a preferred feature of the invention, a rotation angle detecting device for a rotation object includes a rotor which has a yoke and a pair of permanent magnets fixed to the yoke at portions thereof opposite to each other with respect to a rotation axis thereof and a magnetic detector disposed at the rotation axis of the rotation object, and at least one of the permanent magnets has a circumferentially extending rut-shape concavity around the magnet detector to make magnetic flux density in the vicinity of said magnetic detector constant in an axial direction parallel with the center axis.

Therefore, the magnetic flux density of the magnetic flux flowing through the magnet sensing surface becomes constant even if the hall element shifts a little in the axial direction.

According to another feature of the invention, a rotation angle detecting device includes a rotor which has a cylindrical yoke and a pair of permanent magnets fixed to the yoke at portions thereof opposite to each other, and a magnetic detector disposed at a rotation axis of the rotor, and at least one of the pair of permanent magnets has an axially extending elliptic columnar surface having a central portion thicker than others to make magnetic flux density constant in the vicinity of said magnetic detector in a direction in parallel with the diametrically extending axis.

Therefore, the magnetic flux density of the magnetic flux flowing through the magnet sensing surface becomes constant even if the hall element shifts a little in a diametrical direction.

In the above feature, at least one of the permanent magnets has circumferentially extending a rut-shape concavity at a surface thereof around the magnet detector. In this case, the magnetic flux density of the magnetic flux flowing through the magnet sensing surface becomes constant even if the hall element shifts a little in both diametrical and axial directions.

According to another feature of the invention, a rotation angle detecting device for a rotation object includes a rotor which has a yoke having a pair of flat surfaces opposing to each other with respect to a rotation axis of the rotor and a pair of permanent magnets respectively fixed to said flat surfaces and a magnetic detector disposed at a position on the rotation axis, and at least one of the pair of permanent magnets has a circumferentially central portion thinner than others to make magnetic flux density constant in the vicinity of said magnetic detector in a direction in parallel with the diametrically extending axis.

In the above feature, at least one of said pair of permanent magnets may have a circumferentially extending rut-shape concavity at a surface thereof around said magnet detector to make magnetic flux density in the vicinity of said magnetic detector constant in a direction parallel with the center axis. In this case, the magnetic flux density of the magnetic flux flowing through the magnet sensing surface becomes constant even if the hall element shifts a little in both diametrical and axial directions.

Each of the permanent magnets may have a semi-cylindrical inner and outer surface extending in the axial direction, may be formed from a plurality of magnet pieces aligned in a circumferential direction or may extend in parallel to each other in both axial and diametrical directions.

The rut-shape concavity may be disposed at the center of the permanent magnets in its axial direction. The rut-shape concavity may be disposed at a radially inner surface of the permanent magnets or a radially outer surface of the permanent magnets. The rut-shape concavity may have a surface of a multidimensional curve. The rut-shape concavity may have multidimensional curved surfaces which are asymmetric with respect to the axial center line of the permanent magnets.

In this case, the permanent magnets may be flat except the rut-shape concavity.

The elliptical columnar surface may be disposed at a radially inner surface of said permanent magnets. The elliptical columnar surface may be disposed at both the radially inner and outer surfaces of said permanent magnets. The elliptical columnar surface may have a surface of a multidimensional curve. The elliptical columnar surface may be asymmetric with respect to the circumferential center line of the permanent magnets. Different elliptical columnar surfaces may be respectively disposed at the radially inner and outer surfaces of the permanent magnets.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

The invention will be described below with reference to the appended drawings.

Figure 1A:
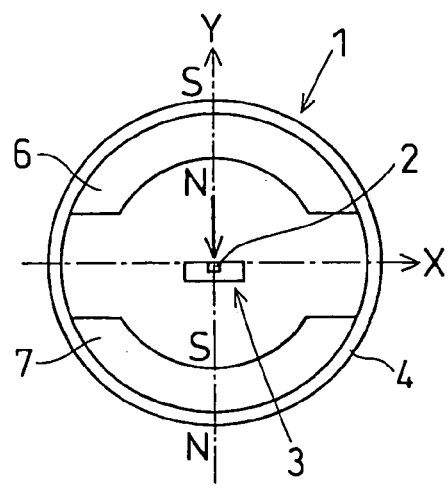
FIGS. 1A and 1B are a cross-sectional plan view and a cross-sectional side view of a rotation angle detecting device according to the first embodiment of the invention.
Figure 1B:
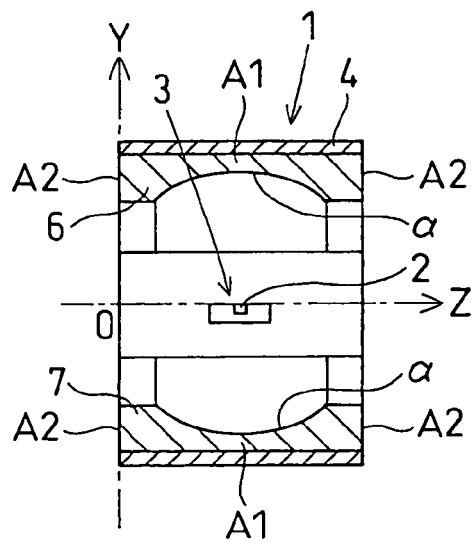
Figure 2:
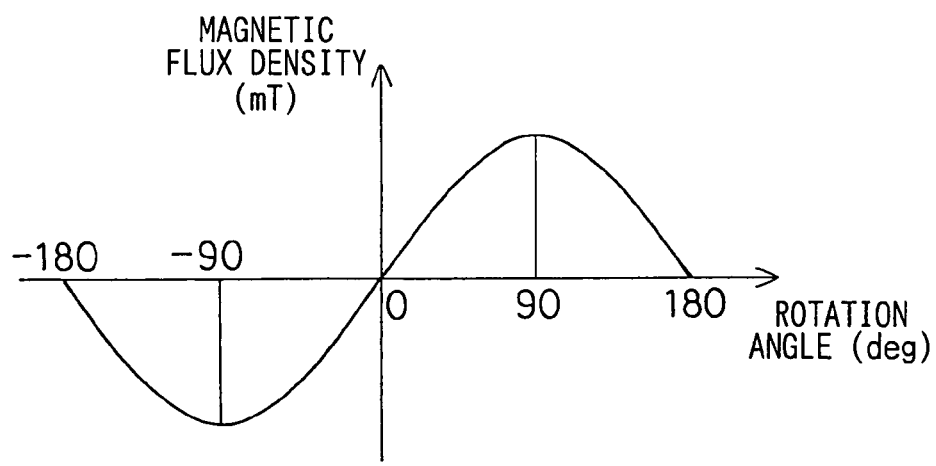
FIG. 2 is a graph showing a relationship between magnetic flux density and rotation angles of the rotation angle detecting device shown in FIG. 1.
Figure 3:
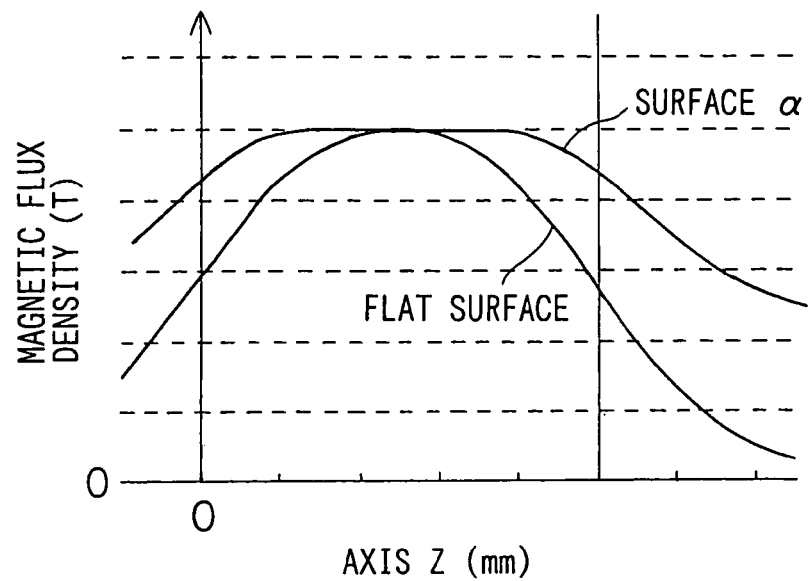
FIG. 3 is a graph showing a relationship between magnetic flux density and axial positions of the rotation angle detecting device shown in FIG. 1.

A rotation angle detecting device according to the first embodiment of the invention will be described with reference to FIGS. 1–3.

The rotation angle detecting device according to the first embodiment is to be used for detecting rotation angle of a throttle valve of an internal combustion engine. The rotation angle detecting device includes a rotor 1, a hall IC 3 in which a hall element 2 is integrated.

The hall IC 3 is supported by a stationary member so that the hall element 2 is positioned on the center axis z of the rotor 1. The hall IC 3 is a well-known type, which includes a signal processing circuit as well as the hall element 2. The hall IC 3 has a magnet sensing surface that provides a signal according to a magnetic flux density in the direction perpendicular to the magnet sensing surface. That is, as shown in FIG. 2, the magnetic flux density sensed by the hall IC 3 becomes maximum when the rotor 1 is positioned as shown in FIG. 1A, and minimum when the rotor 1 rotates 90 degrees in angle from the position shown in FIG. 1A.

The rotor 1 is connected to a rotary shaft of a throttle valve and disposed around the hall IC 3 to be coaxial with the same. The rotor 1 includes a cylindrical yoke 4 and a pair of semi-cylindrical permanent magnets 6 and 7. The permanent magnets 6, 7 are respectively fixed to the yoke 4 at opposite portions of the rotor 1 with respect to the hall element 2 so as to have non-magnetic circumferential spaces between two. The permanent magnet 6 is magnetized in the radial direction to have N pole on its inner surface, and the permanent magnet 7 is magnetized in the radial direction to have S pole on its inner surface. Accordingly, the magnetic flux flows from the permanent magnet 6 through the hall IC 3 to the permanent magnet 7 and returns to the permanent magnet 6 through the yoke 4. Each of the permanent magnets 6, 7 has a circumferentially extending rut-shape concavity α at its radially inner surface, as shown in FIG. 1B. Therefore, each of the permanent magnets 6, 7 has a minimum radial thickness at the axially central portion A1 thereof around the hall element 2 in the axial direction z, as shown in FIG. 1B. That is, each of the permanent magnets 6, 7 has a minimum radial thickness at the center A1 thereof and a maximum thickness at opposite axial ends A2 thereof. The concavity α is formed so that the magnetic flux density of the magnetic flux flowing through the magnet sensing surface becomes constant even if the hall element shifts a little in an axial direction.

Figure 4:
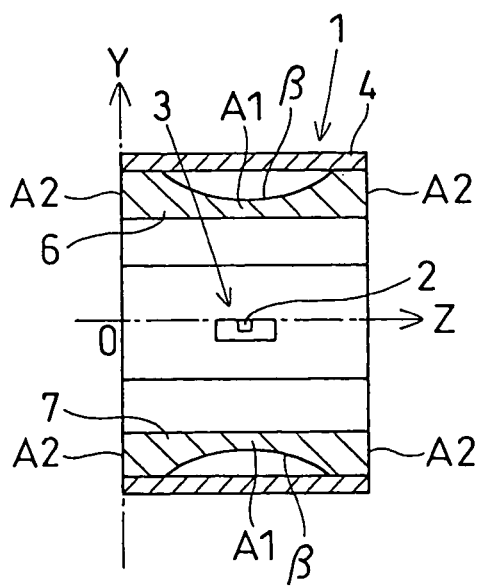
FIG. 4 is a cross-sectional side view of a rotation angle detecting device according to the second embodiment.

A rotation angle detecting device according to the second embodiment of the invention will be described with reference to FIG. 4. Incidentally, the same reference numeral used in the following drawings represents the same or substantially the same portion, part or component as the first embodiment hereafter.

The rotation angle detecting device 1 according to the second embodiment has a pair of permanent magnets each of which has a circumferentially extending rut-shaped concavity β at its radially outer surface. Therefore, each of the permanent magnets 6, 7 has a minimum radial thickness at the axially central portion A1 thereof around the hall element 2 in the axial direction z. The concavity β is formed so that the magnetic flux density of the magnetic flux flowing through the magnet sensing surface becomes constant even if the hall element shifts a little in the axial direction z.

Figure 5:
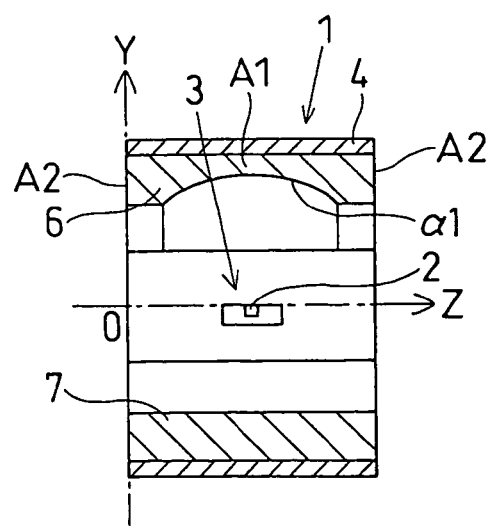
FIG. 5 is a cross-sectional side view of a rotation angle detecting device according to the third embodiment.

A rotation angle detecting device according to the third embodiment of the invention will be described with reference to FIG. 5.

The rotation angle detecting device 1 according to the third embodiment has a pair of permanent magnets 6, 7. However, one of the permanent magnets has a circumferentially extending rut-shaped concavity α1 at its radially inner surface. Therefore, the permanent magnet 6 has a minimum radial thickness at the axially central portion A1 thereof around the hall element 2 in the axial direction z. The concavity α1 is formed so that the magnetic flux density of the magnetic flux flowing through the magnet sensing surface becomes constant even if the hall element shifts a little in the axial direction z.

Figure 6:
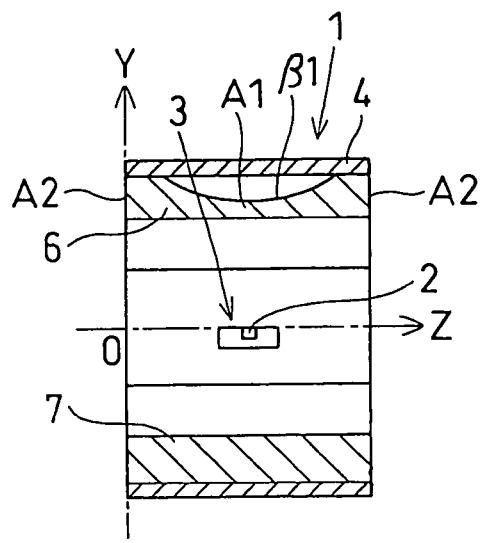
FIG. 6 is a cross-sectional side view of a rotation angle detecting device according to the fourth embodiment.

A rotation angle detecting device according to the fourth embodiment of the invention will be described with reference to FIG. 6.

The rotation angle detecting device 1 according to the fourth embodiment has a pair of permanent magnets 6, 7. One of the permanent magnets has a circumferentially extending rut-shape concavity β1 at its radially outer surface. Therefore, the permanent magnet 6 has a minimum radial thickness at the axially central portion A1 thereof around the hall element 2. The concavity β1 is formed so that the magnetic flux density of the magnetic flux flowing through the magnet sensing surface becomes constant even if the hall element shifts a little in the axial direction z.

Figure 7:
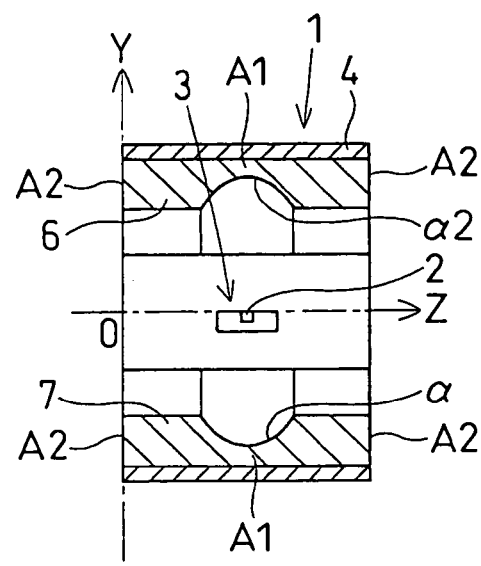
FIG. 7 is a cross-sectional side view of a rotation angle detecting device according to the fifth embodiment.

A rotation angle detecting device according to the fifth embodiment of the invention will be described with reference to FIG. 7.

If the hall element 2 can be fixed to the rotation angle detection device more accurately than the previously described embodiments, the permanent magnets 6, 7 can have a narrower rut-shaped concavity α2 at the radially inner surface thereof. This idea can be applied to any one of the previous embodiments.

A rotation angle detecting device according to the sixth embodiment will be described with reference to FIGS. 8A, 8B, 9 and FIGS. 10A and 10B.

Figure 8A:
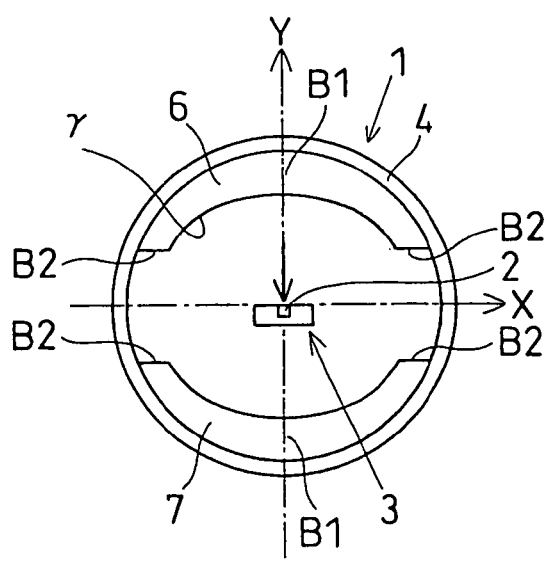
FIGS. 8A and 8B are a cross-sectional plan view and a cross-sectional side view of a rotation angle detecting device according to the sixth embodiment.
Figure 8B:
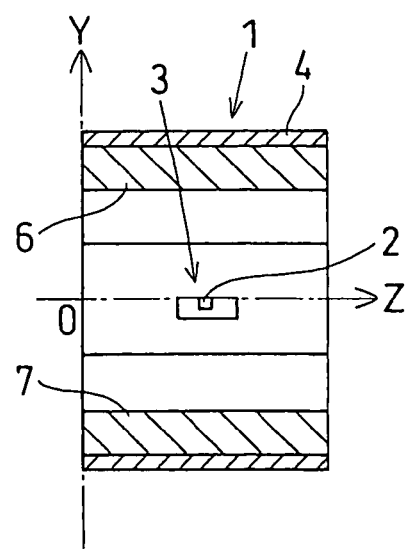
Figure 9:
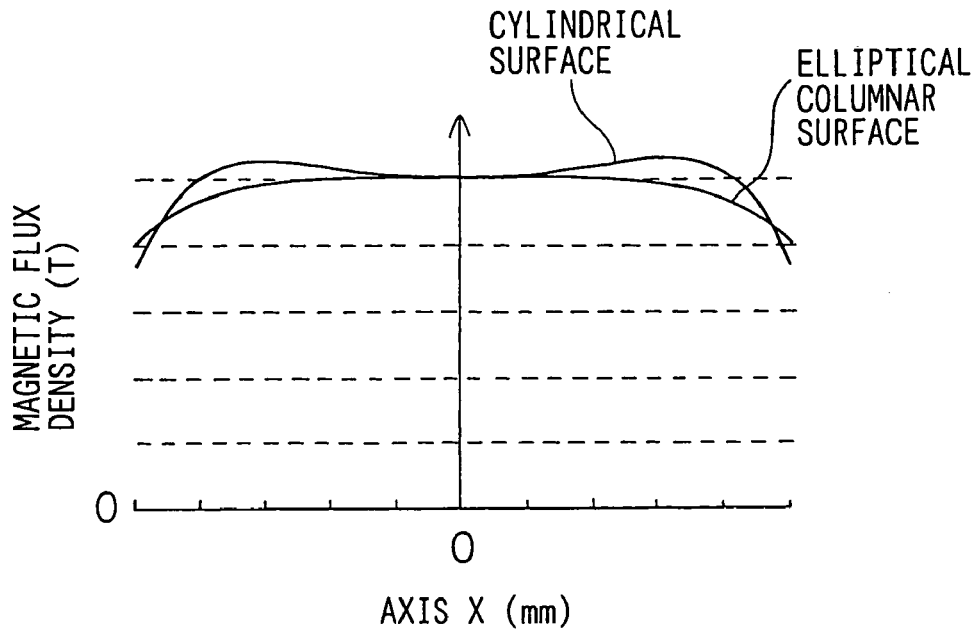
FIG. 9 is a graph showing a relationship between magnetic flux density and radial positions of the rotation angle detecting device according to the sixth embodiment
Figure 10A:
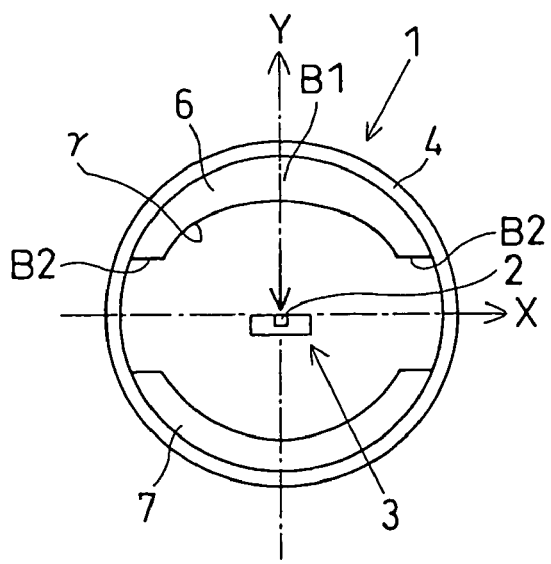
FIGS. 10A and 10B are a cross-sectional plan view and a cross-sectional side view of a rotation angle detecting device according to a modification of the sixth embodiment.
Figure 10B:
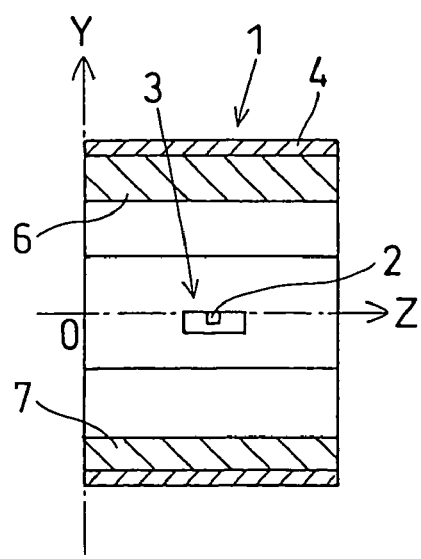

The rotation angle detecting device 1 according to the sixth embodiment has a pair of permanent magnets 6, 7. However, the pair of the permanent magnets 6, 7 has an axially extending elliptic columnar inner surface γ, as shown in FIG. 8A. Therefore, the permanent magnets 6, 7 have a maximum radial thickness at the circumferentially central portion B1 thereof and a minimum thickness at the opposite circumferential ends B2. The elliptic columnar surface γ is formed so that the distance between a portion of each of the permanent magnets and the hall element 2 increases as the portion nears the one of the opposite ends B2. Accordingly, the magnetic flux density of the magnetic flux flowing through the magnet sensing surface becomes constant even if the hall element shifts a little in the diametrical direction x, as shown in FIG. 9. The elliptic columnar surface γ can be formed at radially outer surface of the permanent magnets 6, 7 to provide substantially the same effect as the sixth embodiment. The elliptic columnar surface γ can be formed at one of the pair of permanent magnets 6, 7, either at radially outer or inner surface of the permanent magnets 6, 7, as shown in FIGS. 10A and 10B.

Figure 11A:
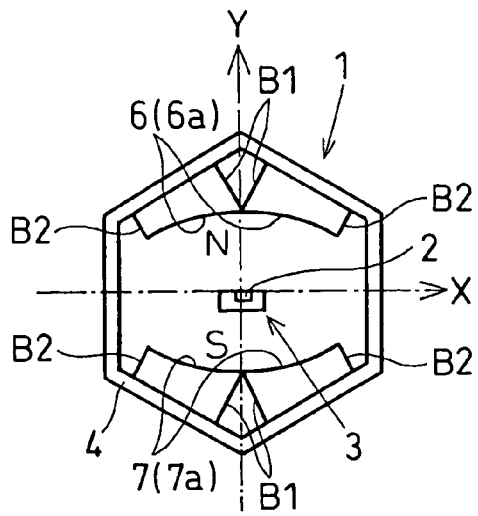
FIGS. 11A and 11B are a cross-sectional plan view and a cross-sectional side view of a rotation angle detecting device according to the seventh embodiment.
Figure 11B:
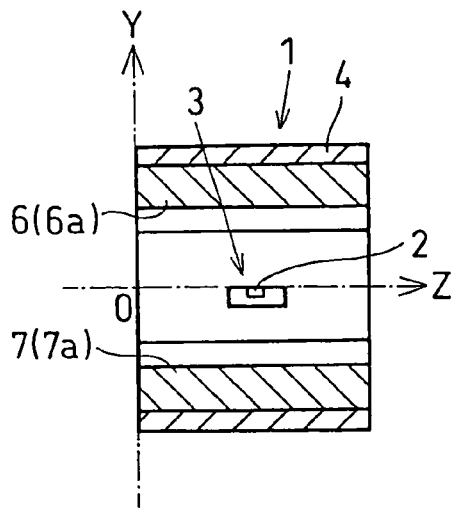

A rotation angle detecting device according to the seventh embodiment will be described with reference to FIGS. 11A and 11B.

Figure 12:
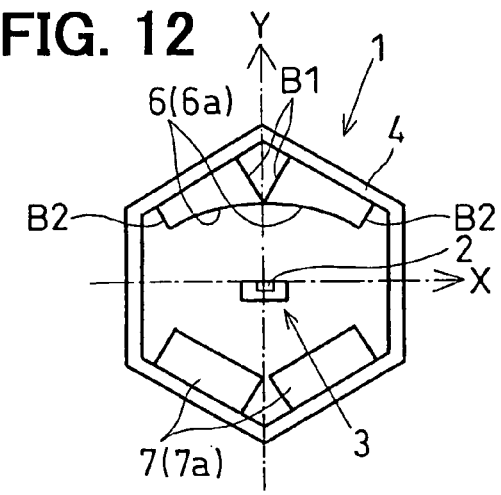
FIG. 12 is a cross-sectional plan view of a rotation angle detecting device according to a modification of the seventh embodiment.
Figure 13A:
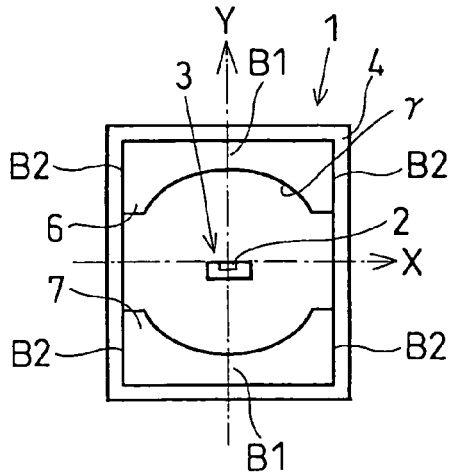
FIGS. 13A and 13B are a cross-sectional plan view and a cross-sectional side view of a rotation angle detecting device according to the eighth embodiment.
Figure 13B:
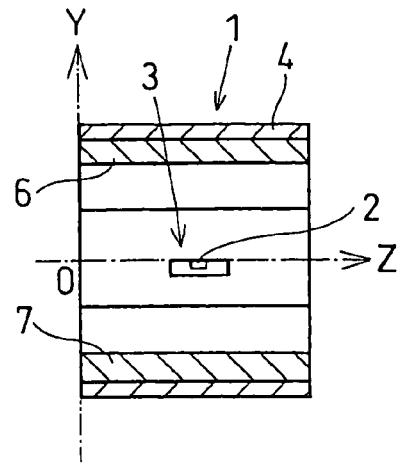

The rotation angle detecting device 1 according to the seventh embodiment has a pair of composite N-pole permanent magnets 6, 6a, and composite S-pole permanent magnets 7, 7a and a yoke of a hexagonal column. Each permanent magnet has a flat back surface which is fixed to one of the hexagonal side surface so that each pair of the composite permanent magnets has an elliptic columnar inner surface. In other words, the permanent magnets 6, 6a, 7 and 7a have a maximum radial thickness at the circumferentially central portion B1 and a minimum thickness at the opposite circumferential ends B2. The elliptic columnar surface γ is formed so that the distance between a portion of each of the permanent magnets and the hall element 2 increases as the portion nears the one of the opposite ends B2. Accordingly, the magnetic flux density of the magnetic flux flowing through the magnet sensing surface becomes constant even if the hall element shifts a little in the diametrical direction x, as shown in FIG. 9. The elliptic columnar surface γ can be formed at radially outer surface of the permanent magnets 6, 7 to provide substantially the same effect. The elliptic columnar surface γ can be formed at one of the pair of composite permanent magnets, either at radially outer or inner surface of the composite permanent magnets 6, 6a, as shown in FIG. 12.

Figure 14:
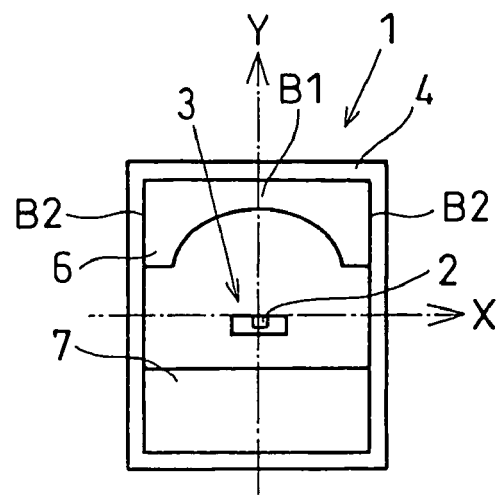
FIG. 14 is a cross-sectional plan view of a rotation angle detecting device according to a modification of the eighth embodiment.

A rotation angle detecting device according to the eighth embodiment will be described with reference to FIGS. 13A, 13B, 14 and 15. The rotation angle detecting device 1 according to the eighth embodiment has a pair of permanent magnets 6, 7, each of which has a flat back surface, and a yoke 4 of a rectangular column. The pair of the permanent magnets 6, 7 has an elliptic columnar front (inner) surface and a flat back surface that is fixed to a flat side surface of the yoke 4. The permanent magnets 6, 7 have a minimum radial thickness at the circumferentially central portion B1 and a maximum thickness at the opposite circumferential ends B2. Because of the different shape of the permanent magnets 6, 7 from those of the sixth embodiment, the elliptic columnar surface γ is formed so that the distance between a portion of each of the permanent magnets and the hall element 2 decreases as the portion nears the one of the opposite ends B2. Accordingly, the magnetic flux density of the magnetic flux flowing through the magnet sensing surface becomes constant even if the hall element shifts a little in the diametrical direction x. The elliptic columnar surface can be formed at radially outer surface of the permanent magnets 6, 7 to provide substantially the same effect. The elliptic columnar surface γ can be formed at one of the pairs of permanent magnets, either at radially outer or inner surface of the permanent magnets 6, 7, as shown in FIG. 14.

Figure 15A:
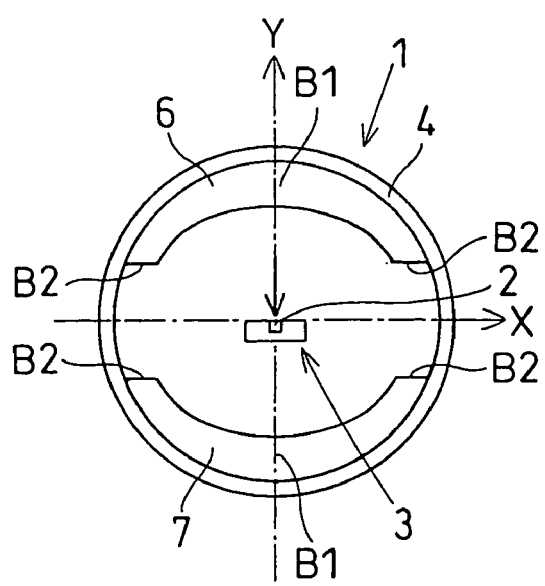
FIGS. 15A and 15B are a cross-sectional plan view and a cross-sectional side view of a rotation angle detecting device according to the ninth embodiment.
Figure 15B:
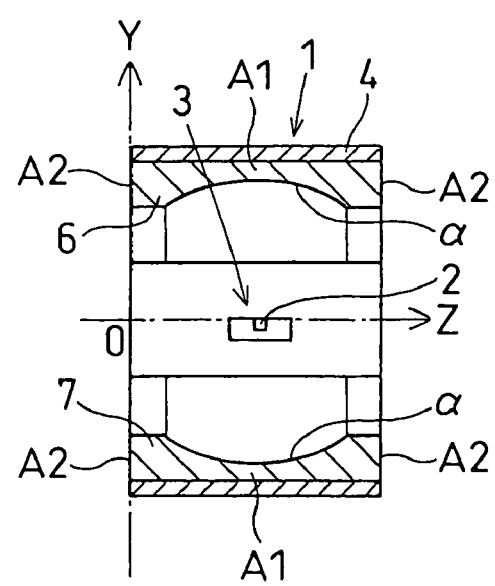

A rotation angle detecting device according to the ninth embodiment will be described with reference to FIGS. 15A and 15B.

The rotation angle detecting device 1 according to the ninth embodiment has a pair of permanent magnets 6 and 7 and a cylindrical yoke 4. Further, each of the pair of the permanent magnets has a semi-cylindrical inner surface at opposite axial ends A2 and a rut-shape concavity α at the axial center thereof A1. That is, the rotation angle detecting device has both features of the first embodiment and the sixth embodiment.

Each of the permanent magnets 6, 7 has a minimum radial thickness at the axial center A1 thereof and a maximum thickness at opposite axial ends A2 thereof. The concavity α is formed so that the magnetic flux density of the magnetic flux flowing through the magnet sensing surface becomes constant even if the hall element shifts a little in the axial direction. The opposite axial end portions A2 of each of the pair of the permanent magnets 6, 7 also have an elliptic columnar inner surface so that the permanent magnets 6, 7 have a maximum radial thickness at the central portion B1 thereof in the circumferential direction and a minimum thickness at the opposite circumferential ends B2. The elliptic columnar surface γ is formed so that the distance between a portion of each of the permanent magnets and the hall element 2 increases as the portion nears the one of the opposite ends B2. Accordingly, the magnetic flux density of the magnetic flux flowing through the magnet sensing surface becomes constant even if the hall element shifts a little in both the diametrical direction x and in the axial direction z.

Figure 16A:
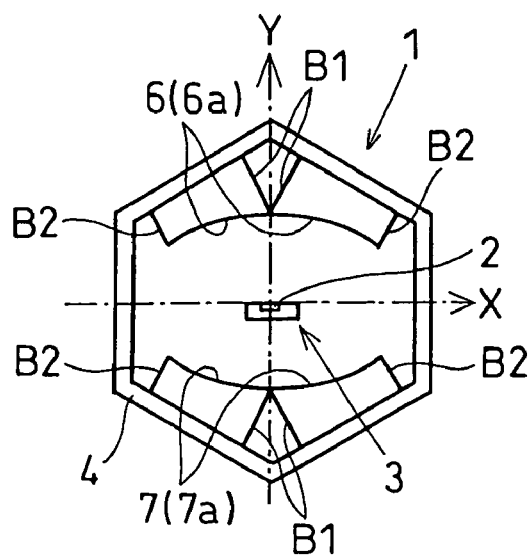
FIGS. 16A and 16B are a cross-sectional plan view and a cross-sectional side view of a rotation angle detecting device according to the tenth embodiment.
Figure 16B:
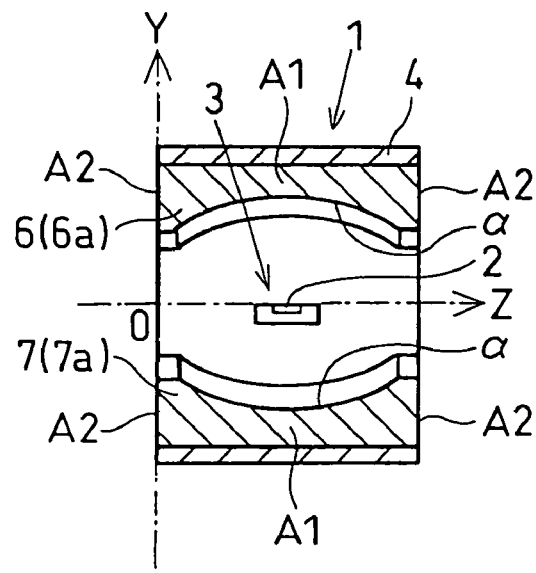

A rotation angle detecting device according to the tenth embodiment will be described with reference to FIGS. 16A and 16B.

The rotation angle detecting device 1 according to the tenth embodiment has a pair of composite N-pole permanent magnets 6, 6a, and composite S-pole permanent magnets 7, 7a and a yoke of a hexagonal column. Further, each of the pair of the composite permanent magnets has an elliptic inner surface at opposite axial ends A2 and a rut-shape concavity α at the axial center thereof A1. That is, the rotation angle detecting device has both features of the first embodiment and the seventh embodiment. Accordingly, the magnetic flux density of the magnetic flux flowing through the magnet sensing surface becomes constant even if the hall element 2 shifts a little in both the diametrical direction x and in the axial direction z.

Figure 17A:
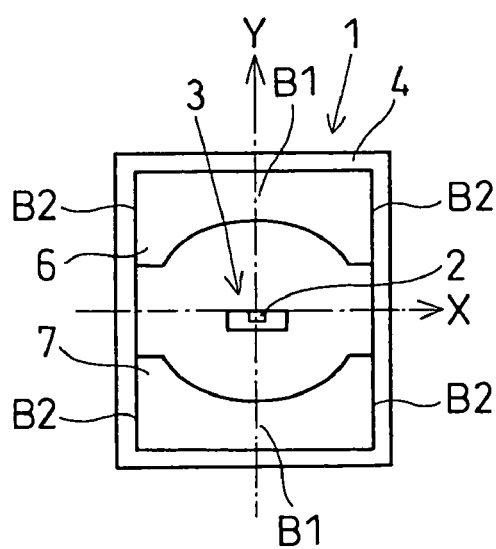
FIGS. 17A and 17B are a cross-sectional plan view and a cross-sectional side view of a rotation angle detecting device according to the eleventh embodiment.
Figure 17B:
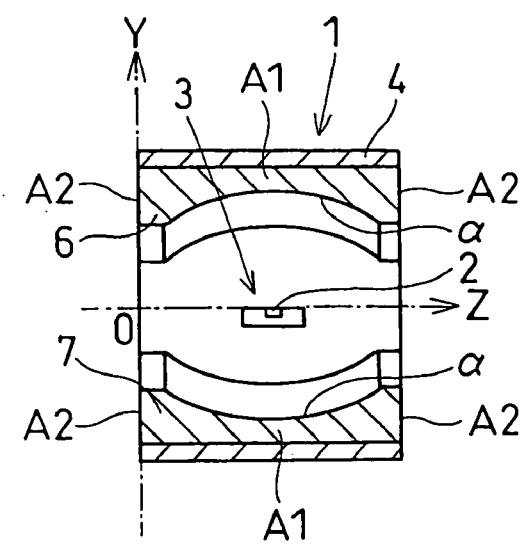

A rotation angle detecting device according to the eleventh embodiment will be described with reference to FIGS. 17A and 17B.

The rotation angle detecting device 1 according to the eleventh embodiment has a pair of permanent magnets 6 and 7, each of which has a flat back surface, and a yoke 4 of a rectangular column. The pair of the permanent magnets 6, 7 has an elliptic columnar front (inner) surface and a flat back surface that is fixed to a flat side surface of the yoke 4. The permanent magnets 6, 7 have a minimum radial thickness at the circumferentially central portion B1 and a maximum thickness at the opposite circumferential ends B2. Further, each of the pair of the permanent magnets has a rut-shape concavity α at the axial center thereof A1. That is, the rotation angle detecting device has both features of the first embodiment and the eighth embodiment. Accordingly, the magnetic flux density of the magnetic flux flowing through the magnet sensing surface becomes constant even if the hall element 2 shifts a little in both the diametrical direction x and in the axial direction z.

Figure 18A:
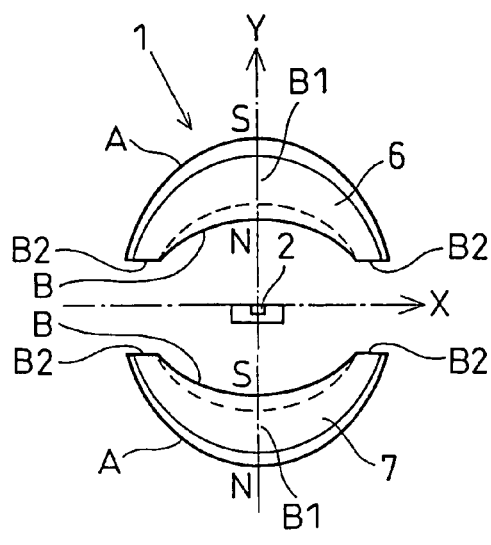
FIGS. 18A and 18B are a cross-sectional plan view and a cross-sectional side view of a rotation angle detecting device according to the twelfth embodiment.

A rotation angle detecting device according to the twelfth embodiment will be described with reference to FIGS. 18A and 18B.

The rotation angle detecting device 1 according to the twelfth embodiment has a pair of permanent magnets 6 and 7. Each of the permanent magnets 6, 7 has a multidimensional curve having a curvature A on the back surface perpendicular to the axis z and a multidimensional curve having a curvature B on the front surface perpendicular to the axis z. Both the multidimensional curves are formed so that the characteristic curve of the magnetic flux density is generally flat around the hall element 2 that is located on the axis x at the middle of the permanent magnets 6, 7.

Each of the curvatures A, B is expressed as follows:

$$A = a_1 X^n + b_1 X^{n-1}$$

$$B = a_2 X^n + b_2 X^{n-1}$$

wherein X represents a diametrical length of the permanent magnets, and the rotation center of each curve is the hall element 2.

Accordingly, the magnetic flux density of the magnetic flux flowing through the magnet sensing surface becomes constant even if the hall element 2 shifts a little in the diametrical direction x.

Figure 18B:
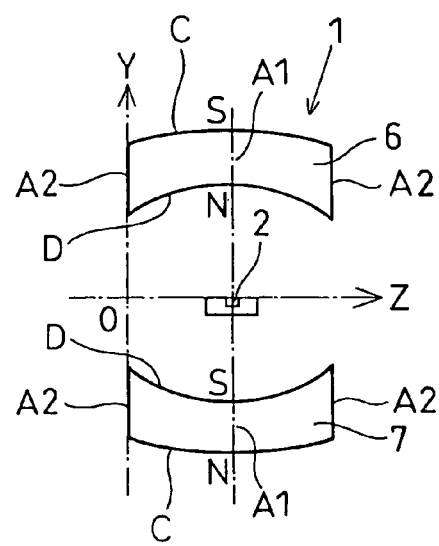

Each of the permanent magnets 6, 7 may have a multidimensional curve having a curvature C on the back surface perpendicular to the axis x and a multidimensional curve having a curvature D on the front surface perpendicular to the axis x, as shown in FIG. 18B. Both the multidimensional curves are formed so that the characteristic curve of the magnetic flux density is generally flat around the hall element 2.

Each of the curvatures C, D is expressed as follows:

$$C = a_3 Z^n + b_3 Z^{n-1}$$

$$D = a_4 Z^n + b_4 Z^{n-1}$$

wherein Z represents an axial length of the permanent magnets, and the rotation center of each curve is the hall element 2.

Accordingly, the magnetic flux density of the magnetic flux flowing through the magnet sensing surface becomes constant even if the hall element 2 shifts a little in the axial direction z.

Figure 19A:
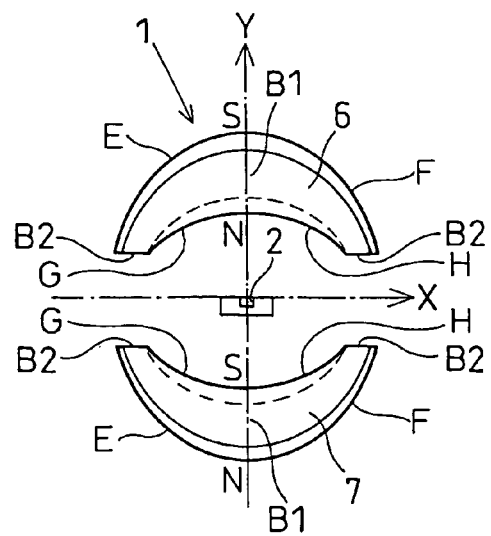
FIGS. 19A and 19B are a cross-sectional plan view and a cross-sectional side view of a rotation angle detecting device according to the thirteenth embodiment.
Figure 19B:
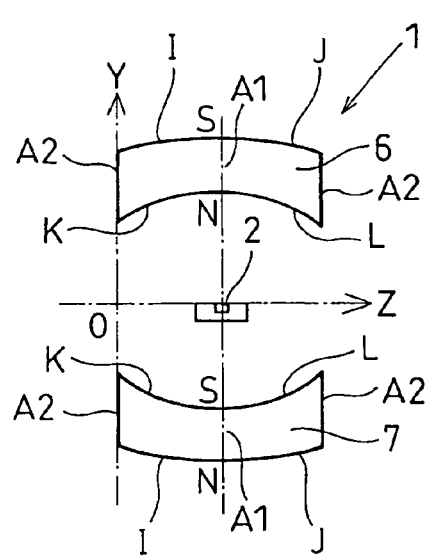

A rotation angle detecting device according to the thirteenth embodiment will be described with reference to FIGS. 19A and 19B.

The rotation angle detecting device 1 according to the thirteenth embodiment has a pair of permanent magnets 6 and 7. Each of the permanent magnets 6, 7 has different multidimensional curvatures E, F on the back surface perpendicular to the axis z and different multidimensional curvatures G, H on the front surface perpendicular to the axis z. The multidimensional curves are formed so that the characteristic curve of the magnetic flux density is generally flat around the hall element 2, even if the respective permanent magnets are formed or magnetized unevenly. This arrangement is also effective when the permanent magnets are used without the yoke 4 which uniforms distribution of the magnetic flux.

Each of the curvatures E, F, G and H is expressed as follows:

$$E = a_5 X^n + b_5 X^{n-1}$$

$$F = a_6 X^n + b_6 X^{n-1}$$

$$G = a_7 X^n + b_7 X^{n-1}$$

$$H = a_8 X^n + b_8 X^{n-1}$$

wherein X represents a diametrical length of the permanent magnets, and the rotation center of each curve is the hall element 2.

Each of the permanent magnets 6, 7 also has different multidimensional curvatures I, J on the back surface perpendicular to the axis x and different multidimensional curvatures K, L on the front surface perpendicular to the axis x. The multidimensional curves are formed so that the characteristic curve of the magnetic flux density is generally flat around the hall element 2, even if the respective permanent magnets are formed or magnetized unevenly.

$$I = a_9 Z^n + b_9 Z^{n-1}$$

$$J = a_{10} Z^n + b_{10} Z^{n-1}$$

$$K = a_{11} Z^n + b_{11} Z^{n-1}$$

$$L = a_{12} Z^n + b_{12} Z^{n-1}$$

wherein Z represents an axial length of the permanent magnets, and the rotation center of each curve is the hall element 2.

Therefore, the characteristic curve of the magnetic flux density becomes generally flat around the hall element 2, even if the respective permanent magnets are formed or magnetized unevenly. This arrangement is also effective when the permanent magnets are used without the yoke 4 which uniforms distribution of the magnetic flux.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device for a rotary object comprising:
    a rotor connected to the rotary object and including a yoke and a pair of permanent magnets fixed to said yoke at portions thereof opposite to each other with respect to a rotation axis thereof, said pair of permanent magnets being magnetized in a direction to be different in polarity from each other; and
    a magnetic detector, disposed at the rotation axis of the rotation object, for detecting magnetic flux density of the magnetic flux;
    wherein at least one of said pair of permanent magnets has a circumferentially extending rut-shape concavity around said magnetic detector, said rut-shape concavity having a surface curved in a plane that includes said rotation axis to make magnetic flux density in the vicinity of said magnetic detector constant in an axial direction parallel with the center axis.

2. The rotation angle detecting device according to claim 1,
    wherein each of said pair of permanent magnets has a semi-cylindrical inner and outer surface extending in the axial direction.

3. The rotation angle detecting device according to claim 1,
    wherein each of said pair of permanent magnets comprises a plurality of magnet pieces aligned in a circumferential direction.

4. The rotation angle detecting device according to claim 1,
    wherein each of said pair of permanent magnets extends in parallel to each other in both axial and diametrical directions.

5. The rotation angle detecting device according to claim 1,
    wherein the rut-shape concavity is disposed at the center of said permanent magnets in its axial direction.

6. The rotation angle detecting device according to claim 5,
    wherein said permanent magnets are flat except the rut-shape concavity.

7. The rotation angle detecting device according to claim 1,
    wherein the rut-shape concavity is disposed at a radially inner surface of said pair of permanent magnets.

8. The rotation angle detecting device according to claim 1,
    wherein the rut-shape concavity is disposed at a radially outer surface of said pair of permanent magnets.

9. A rotation angle detecting device for a rotary object comprising:
    a rotor connected to the rotary object and including a cylindrical yoke and a pair of permanent magnets fixed to said yoke at portions thereof opposite to each other, said pair of permanent magnets being magnetized in a direction to be different in polarity from each other; and
    a magnetic detector, disposed at a rotation axis of the rotor for detecting magnetic flux density of the magnetic flux;
    wherein at least one of said pair of permanent magnets has an axially extending elliptic columnar surface that is concavely curved at least in a plane perpendicular to said rotation axis and having a central portion thicker than other portions thereof to make magnetic flux density constant in the vicinity of said magnetic detector in a direction in parallel with the diametrically extending axis.

10. The rotation angle detecting device according to claim 9,
    wherein at least one of said pair of permanent magnets has a circumferentially extending rut-shape concavity at a surface thereof around said magnetic detector, said rut-shape concavity having a surface curved in a plane that includes said rotation axis to make magnetic flux density in the vicinity of said magnetic detector constant in a direction parallel with the center axis.

11. The rotation angle detecting device according to claim 9, the elliptic columnar surface is disposed at a radially inner surface of said permanent magnets.

12. The rotation angle detecting device according to claim 9, the elliptic columnar surface is disposed at both the radially inner and outer surfaces of said permanent magnets.

13. The rotation angle detecting device according to claim 9,
    wherein different columnar surfaces are respectively disposed at the radially inner and outer surfaces of said permanent magnets.

14. A rotation angle detecting device for a rotary object comprising:
    a rotor connected to the rotary object and including a cylindrical yoke and a pair of permanent magnets fixed to said yoke at portions thereof opposite to each other, said pair of permanent magnets being magnetized in radial directions to be different in polarity from each other; and
    a magnetic detector, disposed at a rotation axis of the rotor for detecting magnetic flux density of the magnetic flux;
    wherein at least one of said pair of permanent magnets has an axially extending elliptic columnar surface having a central portion thicker than others to make magnetic flux density constant in the vicinity of said magnetic detector in a direction in parallel with the diametrically extending axis,
    wherein the elliptic columnar surface is disposed at a radially inner surface of said permanent magnets, and
    wherein the elliptical columnar surface has a surface of a multidimensional curve.

15. A rotation angle detecting device for a rotary object comprising:
    a rotor connected to the rotary object and including a yoke and a pair of permanent magnets fixed to said yoke at portions thereof opposite to each other with respect to a rotation axis thereof, said pair of permanent magnets being magnetized in radial directions be different in polarity from each other; and a magnetic detector, disposed at the rotation axis of the rotation object, for detecting magnetic flux density of the magnetic flux;

wherein at least one of said pair of permanent magnets has a circumferentially extending rut-shape concavity around said magnet detector to make magnetic flux density in the vicinity of said magnetic detector constant in an axial direction parallel with the center axis, wherein the rut-shape concavity is disposed at a radially inner surface of said pair of permanent magnets, and wherein the rut-shape concavity has a surface of a multidimensional curve.

16. The rotation angle detecting device according to claim 15, wherein the rut-shape concavity has multidimensional curved surfaces which are asymmetric with respect to the axial center line of said permanent magnets.

17. A rotation angle detecting device for a rotary object comprising:

a rotor connected to the rotary object and including a cylindrical yoke and a pair of permanent magnets fixed to said yoke at portions thereof opposite to each other, said pair of permanent magnets being magnetized in radial directions to be different in polarity from each other; and a magnetic detector, disposed at a rotation axis of the rotor for detecting magnetic flux density of the magnetic flux;

wherein at least one of said pair of permanent magnets has an axially extending elliptic columnar surface having a central portion thicker than others to make magnetic flux density constant in the vicinity of said magnetic detector in a direction in parallel with the diametrically extending axis, wherein the elliptic columnar surface is disposed at both the radially inner and outer surfaces of said permanent magnets, and wherein the elliptical columnar surface is asymmetric with respect to the circumferential center line of said permanent magnets.

18. A rotation angle detecting device for a rotary object comprising:

a rotor fixed to the rotary object and including a yoke and a pair of permanent magnets fixed to said yoke at portions thereof opposite to each other with respect to a rotation axis thereof, said pair of permanent magnets being magnetized in a direction to be different in polarity from each other; and a magnetic detector, disposed at the rotation axis of the rotation object, for detecting magnetic flux density of the magnetic flux;

wherein at least one of said pair of permanent magnets has a concave groove extending in a direction around said rotation axis, said concave groove having a surface curved in a Diane including said rotation axis for providing even magnetic flux density at a portion around said magnetic detector.

19. A rotation angle detecting device for a rotary object comprising:

a rotor fixed to the rotary object and including a permanent magnet being magnetized in a radial direction; and a magnetic detector, disposed at a rotation axis of the rotary object, for detecting magnetic flux density;

wherein said permanent magnet has a concave axially extending elliptic columnar surface having a surface curved in a plane perpendicular to said rotation axis and surface formed at the central portion thereof to supply magnetic flux of even magnetic flux density to a portion around said magnetic detector, wherein:

the central portion of said permanent magnet is thicker than others to make magnetic flux density constant in the vicinity of said magnetic detector in a direction in parallel with the diametrically extending axis; and the elliptical columnar surface has a surface of a multi-dimensional curve.

20. The rotation angle detecting device according to claim 19, wherein said permanent magnet has a circumferentially extending rut-shape concavity.

21. A rotation angle detecting device for a rotary object comprising:

a rotor connected to the rotary object and including a cylindrical yoke and a pair of permanent magnets fixed to said yoke at portions thereof opposite to each other, said pair of permanent magnets being magnetized in a direction to provide magnetic flux flowing from one of the permanent magnets to the other to pass a preset portion on the rotation axis; and a magnetic detector, disposed at the preset portion for detecting magnetic flux density of the magnetic flux; wherein:

at least one of said pair of permanent magnets has an axially extending elliptic columnar surface having a central portion thicker than others; and the elliptic columnar surface has a surface of a multidimensional curve disposed at a radially inner surface of said permanent magnets.

* * * * *